Patented June 3, 1930

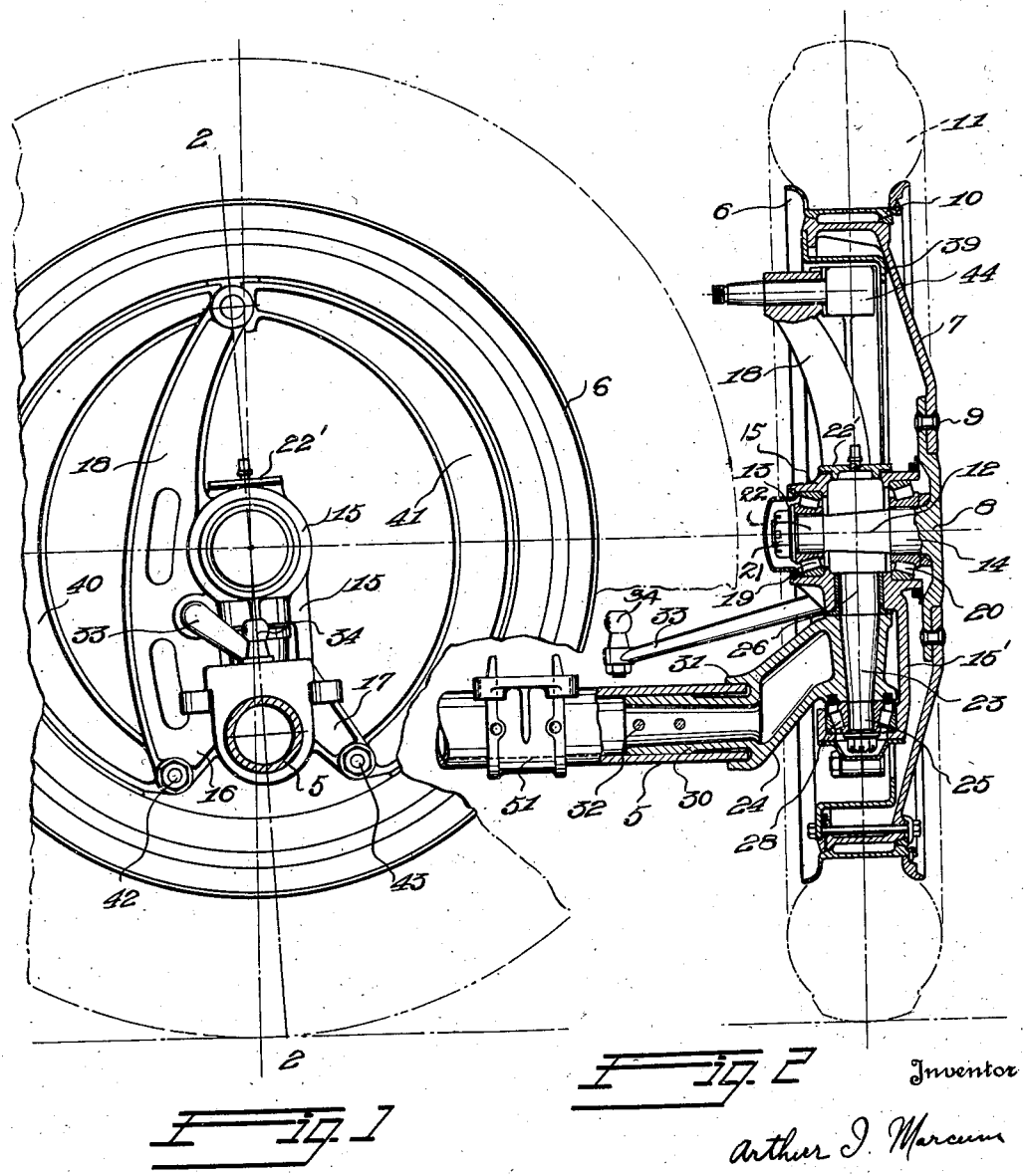

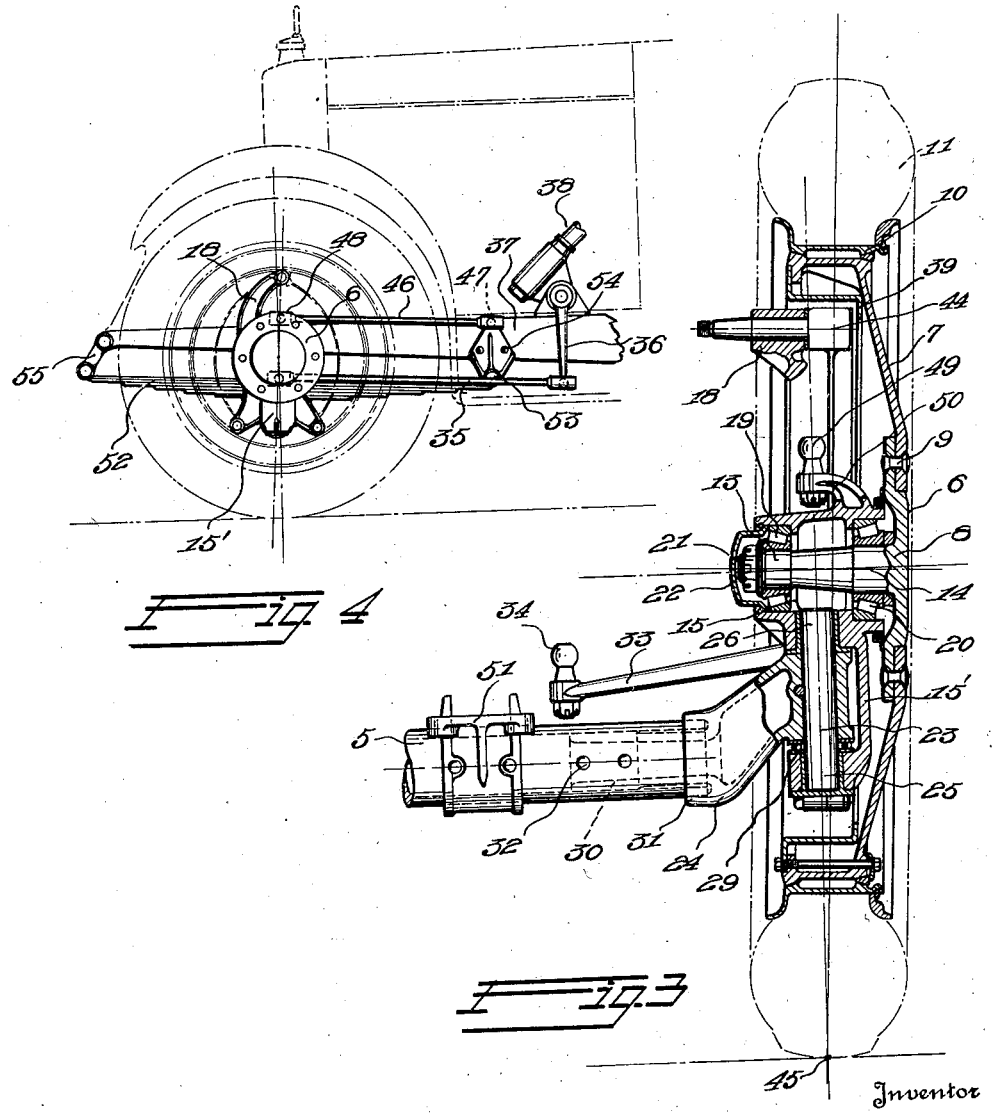

1,761,044

UNITED STATES PATENT OFFICE

ARTHUR I. MARCUM, OF OAKLAND, CALIFORNIA, ASSIGNOR TO EMORY WINSHIP, OF MACON, GEORGIA

STEERING WHEEL AND BRAKE

Application filed August 1, 1927. Serial No. 209,767.

This invention relates to improved steering wheels for use particularly in motor driven road vehicles. In constructions commonly used it is the practice to mount the dirigible wheels of motor driven vehicles for steering movement about king pins that are located to one side of the substantially vertical plane that bisects the tread surface of the tires on such wheels. As a result, the wheels have a tendency to rotate bodily about the king pins and such tendency must be resisted by the steering mechanism, and the steering mechanism becomes susceptible to road shocks that cause wobbling of the wheels and renders steering unnecessarily difficult. Moreover, the operation of brakes applied to wheels mounted with an offset king pin introduces unbalanced forces that further interfere with the efficient steering of a vehicle so equipped. With the advent of low pressure pneumatic tires on dirigible wheels the steering of a vehicle was made still more unsatisfactory because the drag of such tires on the road contributed further to the unbalanced forces that subjected the steering mechanisms to unnnecessary stresses and strains, and made their operation cumbersome. The unbalanced forces set up continuously tended to cause the steering wheels to wobble from a straight course.

The primary object of the invention is to provide a mounting for the dirigible wheels of a road vehicle in which substantially no unbalanced forces tending to cause the wheels to depart from a straight line rotary motion are set up.

A further object of the invention is to provide a dirigible wheel mounting in which an unbalanced force is set up only when the wheel is turned from its straight line course to return it to such course after which substantially no unbalanced forces tending to disturb the travel of the wheel in a straight line are introduced into the mechanism by virtue of the manner in which the wheels are mounted or by virtue of the presence of brakes on the dirigible wheel and its mounting.

A further object of the invention is to provide a dirigible wheel mounting embodying a connection between the wheel mounting and the vehicle frame to resist the brake and other reactions that tend to rotate the wheel mounting with the wheel.

A further object of the invention is to provide a spring mounting and spring so associated that the road shocks will be transmitted more nearly in a direction at a right angle to the length of the springs.

Further objects of the invention will appear as a description thereof proceeds with reference to the accompanying drawing in which, Figure 1 is a view looking at the improved mounting from the inside of the wheel, the axle being shown in cross-section.

Figure 2 is a sectional view taken on the line 2—2 of Figure 1.

Figure 3 is a view similar to Figure 2 but showing a modification.

Figure 4 is a diagrammatic view showing the wheel mounting of Figure 3 and associated parts in full lines and conventional parts in broken lines.

In the drawings, like numerals indicate like parts throughout the several figures.

Numeral 5 indicates the forward axle of a road vehicle and 6 a dirigible wheel supporting the axle. Wheel 6 comprises, preferably, a dished metal body 7 having a spindle member 8 riveted thereto as shown at 9. Preferably the body 7 is provided with a demountable rim 10 carrying a pneumatic or other tire 11. Spindle member 8 has an inwardly projecting spindle 12 integrally, or otherwise, secured thereto. Spindle 12 is provided with spaced cylindrical bearing surfaces 13 and 14.

Spindle 12 is mounted in a hub member 15, provided with a body portion 15' having brake band supporting arms 16 and 17 and a brake cam supporting arm 18. Arranged between the hub member 15 and spindle bearing surfaces 13 and 14 are roller bearings 19 and 20, the bearings just referred to, the hub member 15 and the wheel spindle 12 being held in assembled relation by nuts 21 adjustably secured to a threaded extension on said spindle in known manner. A suitable dust cap 22 protects the bearings 19 and 20, and a threaded cap 22' is supplied for hub 15 through which access may be had to the interior of the hub.

A king pin 23 secured to a bracket 24 carried by axle 5 serves to connect hub member 15 to axle 5 in a manner permitting shifting of the wheel to effect the steering of the vehicle. King pin 23 has projecting ends 25 and 26 that are journalled in the body 15' of hub member 15, a roller thrust bearing 28 as in Figure 2 or a combination plain and and ball thrust bearing 29 as in Figure 3 being provided to support the weight of the axle and the parts carried thereby with a minimum of friction between body 15' and bracket 24.

Preferably bracket 24 is provided with a tubular extension 30 that fits within tubular axle 5 and a tubular flange 31 that surrounds and snugly fits around the end of said axle. Rivets 32 or other suitable securing means serve to secure the bracket 24 and axle 5 in assembled relation.

A suitable steering arm 33 projects inwardly from hub member 15, the ball 34 of which is connected by a link 35 to the end of a steering arm 36 pivotally carried by the vehicle frame 37. Any conventional steering mechanism 38 may be utilized to control the movement of arm 36.

Secured within the dished wheel body is a brake drum 39. Cooperating with said brake drum are brake shoes 40 and 41 (Figure 1), shoe 40 being pivoted at 42 to arm 16 of hub member 15 and shoe 41 being pivoted at 43 to arm 17 of said member. The brake shoes just referred to are arcuate in form and the free ends are separated by a brake cam 44 of usual construction. Said cam is journaled in arm 18 of hub member 15 (Figures 2 and 3) and may be actuated in any well known manner to cause the shoes 40 and 41 to engage the drum 39.

It will be observed in the form of the invention shown in Figures 1 and 2, that the axis of the king pin 23 lies in the vertical plane that bisects the tread surface of the tire carried by the wheel and that the brake surface of brake drum 39 is bisected by the same plane. When the wheel is moving forward in a straight line substantially no unbalanced forces tending to swing it about its king pin 23 accordingly are present, either as a result of the mounting of the wheel on its king pin or as a result of the operation of the brake. Thus, no strains are introduced in the steering mechanism and no substantial forces are present to cause wobbling of the wheels if slight looseness develops in the steering mechanism.

The axis of the king pin 23, however, is slightly inclined in a plane transverse to the vehicle, as shown in Figure 1, so that a line coincident with the pin axis intersects the ground over which the wheel is moving at a point in front of the point of intersection with the ground of a vertical line passing through the center of rotation of the wheel. The angle between these lines is preferably about 3°. As a result of this arrangement it will be observed that, since the inclination of the king pin is in a central vertical plane that contains the axis of the king pin and extends in the direction of travel of the vehicle, substantially no unbalanced forces are set up by such inclination to turn the wheel on the axis of the king pin. However, when the wheel is turned on its king pin to effect steering of the vehicle, forces are set up due to the forwardly inclined king pin, that tend to cause the wheel to assume a position in which the axis of the pin is in the vertical plane that extends in the direction of the normal forward movement of the vehicle. The unbalanced couple thus set up tends to restore the dirigible wheels to their straight line position and thus tends to prevent, rather than to cause as in constructions heretofore proposed, wobbling of the dirigible wheels.

Instead of mounting the wheel on the hub member 15 in such a way that the plane that bisects the tread surface is a vertical plane, the arrangement shown in Figure 3 may be used. In this form of the invention, the axis of the king pin 23 extends vertically and the pin is inclined forwardly as in Figure 1. The hub member 15, however, is so constructed that the plane that bisects the tread surface of the wheel extends at an angle of about 2° to the vertical and intersects the plane that contains the axis of the vertical king pin at the point 45 which is the point of contact between the wheel and the ground. In this arrangement substantially the same results are secured that are obtained by the construction shown in Figures 1 and 2.

The application of the brakes to a dirigible wheel causes a reaction that tends to rotate the hub member and thus shear the ends of the king pin that engage the said member and to twist the axle 5, the forces due to said reaction being ordinarily resisted by the springs. In order to effectively resist said reaction independently of the king pin, axle and springs, and to relieve the king pin and axle of the strains due thereto, a torque rod 46 is secured to the frame 37 at one end by a ball and socket joint 47 and at the other end 48 is secured to the ball head 49 of a short arm 50 (Figure 3) integrally, or otherwise, connected to hub member 15. It will be observed that the center of ball connection 49 is in the plane transverse of the vehicle, that contains the slightly inclined king pin axis, so that the torque rod is unaffected by the steering movements of the wheel, while, at the same time, it effectively serves to resist the reactions that tend to rotate the hub member when the brakes are applied.

Mounted on axle 5 is a spring pad 51 that supports a spring 52, one end of which is pivoted at 53 to a bracket 54 secured to frame 37, and the other end of which is connected by a shackle 55 to said frame in known manner. It will be noted that the spring 52 is built up of substantially flat leaves so that the distance of the axle 5 and spring pad 51 from pin 53 is substantially constant, and that socket joints 47 and 49 are so located that the torque arm 46 is substantially parallel to spring 52 and its length is approximately equal to the distance from pin 53 to the center of pad 51. With this arrangement a substantial parallel movement of the wheel hub and brake parts is secured as spring 52 swings about pivot 53 under road conditions. It will also be noted that ball joint 34 for steering link 35 is located in the vertical transverse plane of the king pin axis and that link 35 is substantially in the plane of pin 53 and parallel to the spring 52. This arrangement of parts giving a minimum wheel flutter and strain on the steering parts as spring 52 swings about pivot 53 under road conditions. It will be understood that links 35 and 46 are of the usual drag link construction and are provided with suitable short compensating springs, not shown, at the ball connections.

Pad 51 is provided with a tubular socket that fits the tubular axle 5. Said pad may accordingly be readily adjusted along the axle in an endwise direction, and may be shifted angularly about the axis of the axle.

The top surface of pad 51 is not horizontal as is customary, but it is angularly adjusted until it is inclined so that said surface extends substantially at right angles to the forwardly inclined king pin. The road shocks, which are transmitted to the wheel about at the point where a continuation of the axis of the inclined king pin meets the ground, are thus transmitted substantially at a right angle to the length of the spring. By this arrangement the springs are positioned so that the shocks are effectively met by the springs in their direction of maximum resilience.

The operation of the invention will be clear from the above description. Said invention may be embodied in other specific forms without departing from the spirit or essential characteristics of the invention, and the present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What I claim as my invention is:

1. In a road vehicle, the combination of a stationary axle, a spindle member mounted on said axle so as to rotate freely around a substantially horizontal axis and to swivel about an axis that is slightly inclined with respect to a vertical line, a wheel secured to said spindle member with the plane longitudinally bisecting the wheel tread including said inclined axis, and mechanism to control the movement of said wheel about said inclined axis.

2. In a road vehicle, the combination of a stationary axle, a hub member mounted on said axle so as to rotate about an axis that is located in a substantially vertical plane that longitudinally intersects that portion of the wheel tread which contacts with the ground but that is slightly inclined with respect to a vertical line in said plane passing through the wheel center, a wheel journaled in said hub member to rotate freely about a substantially horizontal axis, and mechanism to control the movement of said wheel about said first named axis.

3. In a road vehicle, the combination of a stationary axle, a hub member, a king pin secured to said axle and journaled in said hub member for rotation about an axis that is located in a substantially vertical plane that longitudinally bisects that portion of the wheel tread which is in contact with the ground but that is slightly inclined with respect to a vertical line in said plane so that a continuation of said axis will intersect the ground at a point forwardly of the center of said contacting portion, and a wheel journaled for rotation in said hub member about a substantially horizontal axis.

4. In a road vehicle, the combination of a stationary axle, a wheel, a hub member to connect said wheel and said axle, said hub member being provided with bearings to support said wheel for rotation about a substantially horizontal axis, and being provided with bearings for a king pin carried by said axle, said last named bearings being arranged so that the axis thereof lies in a substantially vertical plane that bisects that portion of the wheel tread which is in contact with the ground and is inclined forwardly with respect to a vertical line in said plane and mechanism to control the movement of said wheel about said king pin.

5. The combination defined in claim 4 in which the king pin bearings are arranged beneath said wheel bearings.

6. In a road vehicle in combination, an axle, a king pin carried by said axle, a dirigible wheel, a wheel spindle carried thereby, and a member uniting said king pin and spindle so that said spindle is free to rotate about a substantially horizontal axis and that said king pin is free to rotate about an axis that is located in the substantially vertical plane that longitudinally bisects at least a portion of the wheel tread but is slightly inclined with respect to a vertical line in said plane.

7. The combination defined in claim 6 including cooperating brake members surrounding said king pin with their cooperating brake surfaces being substantially bisected by said vertical plane.

8. In a road vehicle, the combination of an axle, a wheel, a member uniting said wheel and axle for rotation of the wheel about a horizontal axis and for swiveling movement of the wheel about an axis lying substantially in a vertical plane that bisects the wheel tread, brake elements having co-operating brake surfaces that are substantially bisected by said plane, and a connection between said member and the vehicle frame that does not substantially restrict the swiveling movement of said wheel but serves to resist the torque tending to rotate said member and axle.

9. In a road vehicle, the combination of a frame, an axle, a wheel, a member uniting said axle and wheel so that the wheel may be steered, a brake drum secured to said wheel, brake elements cooperating with said drum and secured to said member, and a connection between said member and said frame to resist the brake reactions tending to rotate said member, said connection permitting the substantially unhampered steering of said wheel.

10. In a road vehicle, the combination of a frame, an axle, a dirigible wheel, and a member connecting said axle and wheel so that said wheel can swivel about an axis that lies in a vertical plane that substantially bisects the wheel tread, a brake drum secured to said wheel, cooperating brake elements carried by said member, said drum and elements being so arranged that said plane substantially bisects the area of contact when the brake is in operative position, and a connection between said frame and said member to resist the brake reactions imposed on the latter by the operation of said brake elements.

11. The combination defined in claim 10 in which said connection is united to said member by a universal joint, the center of which lies in alignment with the axis of the swivel connection of the wheel.

12. In a road vehicle, the combination of a frame, an axle, a king pin carried by said axle, a wheel arranged for steering movement about said king pin, a brake drum carried by said wheel, cooperating brake elements carried by said axle, and a connection between said frame and said axle to resist the brake reactions united to said axle at a point that is in alignment with the axis of rotation of the wheel about said king pin, whereby said connection permits the unrestricted steering of said wheel.

13. In a road vehicle, the combination of a frame, an axle, a dirigible wheel, a member uniting said wheel and axle so that the wheel is free to rotate about a substantially horizontal axis located substantially above said axle and to swivel about an axis that is located in a substantially vertical plane that longitudinally bisects at least a portion of the wheel tread, a brake drum carried by said wheel, brake elements carried by said member, and a connection between said frame and said member united to said member substantially above said horizontal axis and in alignment with the axis of said swivel whereby the tendency of said member to rotate by virtue of the brake reactions is resisted without substantially restricting the steering movements of said wheel.

14. In a road vehicle, in combination a frame, an axle, a wheel, a spring between said axle and frame, a member uniting said wheel and axle so that said wheel is free to rotate about a substantially horizontal axis and to swivel about an axis that is located in the substantially vertical plane that substantially bisects that portion of the wheel tread which is in contact with the ground, said last mentioned axis being slightly inclined with respect to a vertical line in said plane, and a torque connection between said member and frame, said connection being united to said member by a universal joint, the center of which is in substantial alignment with the axis about which the wheel swivels.

15. The combination defined in claim 14 in which said springs extend lengthwise in a direction that is normal to the axis about which said wheel swivels.

16. In a road vehicle the combination of a tubular axle, a bracket having a tubular socket to receive said axle, a spring pad angularly adjustable about said axle, a king pin secured to said bracket, a wheel, and a member uniting said wheel and said king pin with the axis of said king pin in the substantially vertical plane that substantially bisects that portion of the wheel tread which contacts with the ground, said axis being slightly inclined forwardly with respect to a vertical line in said plane, the supporting surface of said spring pad being adjusted so that it is normal to the axis of said king pin.

17. In a road vehicle, the combination of an axle, a wheel having a brake drum and a member connecting said axle and wheel so that the wheel is capable of free rotary movement about a substantially horizontal axis and to swivel about an axis that lies in an upright longitudinal plane that substantially bisects the wheel tread where it contacts with the ground and that is slightly inclined with respect to a vertical line in said plane, said member comprising brake shoe and brake cam supporting arms, brake shoes and a brake cam mounted on said arms and cooperating with said brake drum, the brake shoes engaging the drum so that the braking surfaces are substantially bisected by said longitudinal plane that bisects the wheel tread whereby substantially no unbalanced forces due to the action of the brakes are set up.

18. The combination defined in claim 17 including an element extending between said member and the vehicle frame and connected to said member at a point in alignment with the axis about which the wheel swivels to resist the brake reactions without substantially interfering with the steering movement of the wheel.

19. In a road vehicle, in combination a frame, an axle, a dirigible wheel, a member connecting the dirigible wheel to said axle, cooperating brake elements carried by said member and wheel respectively, means to control said dirigible wheel, and a connection between said frame and said member to resist the brake reactions independently of the means to control said wheel.

In testimony whereof I affix my signature.

ARTHUR I. MARCUM.